US012653087B2

(12) United States Patent
Mümken et al.

(10) Patent No.: US 12,653,087 B2
(45) Date of Patent: Jun. 16, 2026

(54) ASSISTANCE SYSTEM FOR CONTROLLING A FORAGE HARVESTING CHAIN

(71) Applicant: CLAAS Saulgau GmbH, Bad Saulgau (DE)

(72) Inventors: Philipp Mümken, Biberach an der Riß (DE); Josef Fischer, Biberach (DE); Martin Reinhardt, Hohentengen (DE); Christian Schmid, Owingen (DE); Magnus Rupp, Rosenberg (DE); Sascha Pflanze, Bad Saulgau (DE); Andreas Mock, Wolpertswende (DE); Martin Ober, Trichtingen (DE); Joachim Oldenburg, Harsewinkel (DE); Michael Fugunt, Bad Wurzach (DE); Waldemar Thiesmann, Osnabrück (DE); Michael Becker, Hohentengen (DE); Robin Monkenbusch, Rheda-Wiedenbrück (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 298 days.

(21) Appl. No.: 18/592,668

(22) Filed: Mar. 1, 2024

(65) Prior Publication Data

US 2024/0292775 A1 Sep. 5, 2024

(30) Foreign Application Priority Data

Mar. 1, 2023 (DE) ..................... 10 2023 104 980.1

(51) Int. Cl.
| | |
|---|---|
| *A01D 91/04* | (2006.01) |
| *A01B 69/04* | (2006.01) |
| *A01D 41/127* | (2006.01) |

(52) U.S. Cl.
CPC ........ *A01B 69/008* (2013.01); *A01D 41/1277* (2013.01); *A01D 91/04* (2013.01)

(58) Field of Classification Search
None
See application file for complete search history.

(56) References Cited

U.S. PATENT DOCUMENTS

| | | | | |
|---|---|---|---|---|
| 7,555,283 B2 * | 6/2009 | Fitzner | ................. | G05D 1/0282 |
| | | | | 340/902 |
| 7,742,860 B2 * | 6/2010 | Diekhans | ............. | A01B 69/007 |
| | | | | 701/410 |

(Continued)

FOREIGN PATENT DOCUMENTS

| | | | | |
|---|---|---|---|---|
| CN | 115657669 A | * | 1/2023 | |
| DE | 202019000311 U1 | | 2/2019 | |

(Continued)

OTHER PUBLICATIONS

CN-115657669-A.*
European Search Report for EP Application No. 24152170.7-1105 mailed Jul. 1, 2024.

*Primary Examiner* — Shelley Chen
(74) *Attorney, Agent, or Firm* — Lempia Summerfield Katz LLC

(57) ABSTRACT

An assistance system for optimizing a forage harvesting process is disclosed. The assistance system supports a user in optimizing an agricultural job that describes a forage harvesting process. Optimizing the forage harvesting process comprises at least the planning and/or execution of the forage harvesting process chain effecting the implementation of the agricultural job. The forage harvesting process chain comprises process steps and agricultural work machines which process the agricultural job in a specified sequence. The assistance system optimizes execution of the agricultural job according to specified strategies by selecting (Continued)

optimal values for work parameters and an optimized sequence of process steps.

21 Claims, 3 Drawing Sheets

(56)                    References Cited

U.S. PATENT DOCUMENTS

| | | | |
|---|---|---|---|
| 8,285,459 B2 * | 10/2012 | Diekhans | A01B 69/007 |
| | | | 701/411 |
| 11,497,157 B2 | 11/2022 | Meyer Zu Helligen | |
| 2005/0273253 A1 * | 12/2005 | Diekhans | G01C 21/20 |
| | | | 701/50 |
| 2008/0195270 A1 * | 8/2008 | Diekhans | G01C 21/20 |
| | | | 701/532 |
| 2017/0322550 A1 | 11/2017 | Yokoyama | |
| 2020/0196526 A1 * | 6/2020 | Koch | G05D 1/0287 |
| 2021/0059113 A1 | 3/2021 | Wire | |
| 2021/0243938 A1 | 8/2021 | Blank | |
| 2022/0171411 A1 * | 6/2022 | Chiocco | G06Q 10/06315 |
| 2022/0210975 A1 | 7/2022 | Digman | |
| 2022/0279710 A1 | 9/2022 | Wieckhorst | |

FOREIGN PATENT DOCUMENTS

| | | |
|---|---|---|
| EP | 3314997 B1 | 2/2020 |
| KR | 20170081685 A | 7/2017 |

* cited by examiner

ASSISTANCE SYSTEM FOR CONTROLLING A FORAGE HARVESTING CHAIN

CROSS REFERENCE TO RELATED APPLICATION

This application claims priority under 35 U.S.C. § 119 to German Patent Application No. DE 10 2023 104 980.1 filed Mar. 1, 2023, the entire disclosure of which is hereby incorporated by reference herein.

TECHNICAL FIELD

The present invention relates to assistance system for optimizing a forage harvesting process, wherein the assistance system is configured to support a user in the optimization of an agricultural job describing a forage harvesting process.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

EP 3 314 997 B1 discloses a harvest management system that, by using suitable sensors, monitors the moisture of a forage crop to be harvested and controls downstream harvesting process steps depending on the detected crop moisture. In particular, it is disclosed therein that the so-called tedding or turning of the crop deposited on the field is controlled depending on the detected harvested material moisture. It is also described that the harvested crop is only harvested and pressed into bales using baling presses once a certain moisture content has been reached.

DE 20 2019 000 311 U1 discloses a similar approach, wherein an expected dry matter content is estimated depending on process stages and processing intensities. It is also described that a wide variety of boundary conditions are taken into account in the estimation of the dry matter content, and target settings of processing elements are determined and exchanged between a wide variety of work machines.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
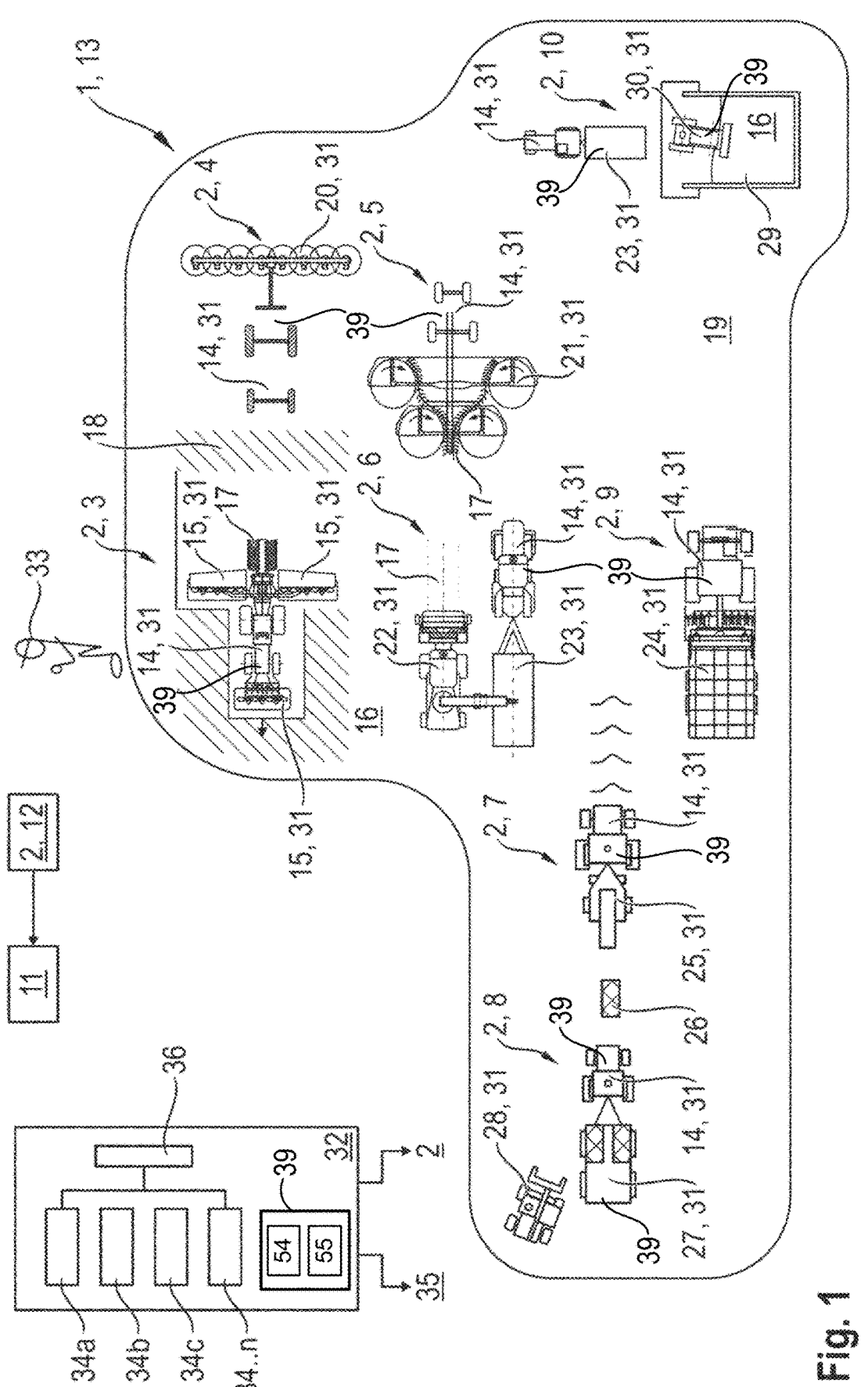
FIG. 1 illustrates a schematic representation of the forage harvesting process chain according to one embodiment of the invention.

As discussed in the background, EP 3 314 997 B1 discloses a harvest management system that monitors the moisture of a forage crop to be harvested and controls downstream harvesting process steps depending on the detected crop moisture. In such a system, individual steps of a forage harvesting process may be controlled depending on the detected crop moisture. However, a complete forage harvesting process is significantly more complex. In this regard, controlling individual steps of a forage harvesting process depending solely on the moisture of the crop to be harvested may not ensure that the harvested material (e.g., crop) has a sufficiently high harvest quality suitable for storage. Similarly, DE 20 2019 000 311 U1 has the problem that only the dry matter, the counterpart to crop moisture, is monitored and used to control a forage harvesting process.

Thus, in one or some embodiments, an assistance system is disclosed which may take better account of the complex interrelationships of a forage harvesting process and may be more likely or ensure that high-quality harvested material is produced, which may be suitable for storage and which may have a high energy content.

In one or some embodiments, the assistance system configured to improve or to optimize a forage harvesting process is configured to support a user in improving or optimizing an agricultural job describing the forage harvesting process. In one or some embodiments, the improvement or optimization of the forage harvesting process may comprise at least the planning and/or executing a forage harvesting process chain (such as automatically planning and/or executing a forage harvesting process chain), thereby effecting the implementation of the agricultural job (such as the automatic the implementation of the agricultural job). The forage harvesting process chain may comprise a plurality of process steps and a plurality of agricultural work machines which process the agricultural job in a specified sequence. In one or some embodiments, one, some or all of the plurality of process steps are automatically performed by at least one agricultural work machine. The assistance system may be further configured to improve or optimize the execution of the agricultural job according to specified strategy(ies). In one or some embodiments, the specified strategies may be stored in and/or transferred thereto. In one or some embodiments, the assistance system may use the specified strategies to generate improved or optimized work parameters (e.g., improved or optimized values for the work parameters) and improved or optimized process steps (e.g., a sequence of process steps that are selected from a plurality of potential process steps) for the forage harvesting process chain and the agricultural machines forming it. For example, the assistance system may be configured to automatically access one or more specified strategies (e.g., the one or more specified strategies automatically determined by the assistance system without operator input; the one or more specified strategies selected by the operator, and thereafter automatically accessed by the assistance system without operator input). After which, the assistance system may automatically generate the optimized values of work parameters (e.g., the values of the work parameters that may be optimal) and/or the improved or optimized process steps (e.g., a sequence of process steps that may be selected from the plurality of potential process steps, with the selection of the specific process steps (from the plurality of potential process steps) and the sequence or order of the selected process steps both being optimal). After which, the assistance system may automatically control at least one agricultural work machine based on the automatically generated the optimized values work parameters (e.g., using the values for the work parameters for automatic control) and/or the improved or optimized process steps (e.g., the sequence of the process steps for at least partly automatic control of one, some or all of the process steps in the sequence). In one way, the at least one agricultural work machine may automatically implement the automatically generated optimized values for the work parameters and/or the improved or optimized sequence of process steps in order to automatically control the at least one agricultural work machine in order to automatically perform the agricultural job. In another way, the assistance system may output one or both of the automatically generated optimized values of work parameters and/or the improved or optimized sequence of process steps (such as output on the touchscreen). After operator approval, the at least one agricultural work machine may automatically implement the automatically generated optimized values for the work parameters and/or the improved or optimized sequence of process steps in order to automatically control the at least one agricultural work machine, thereby at least partly (or entirely) automatically perform the agricultural job. In this way, complex forage harvesting process chains may be improved or optimized so that high-quality harvested material suitable for storage and having a high energy content may be produced. Further, any one, any combination, or all of the following may be automatically implemented: (1) determining the one or more specified strategies; (2) generating optimized values for the work parameters and/or the improved or optimized sequence of process steps; or (3) controlling one or more agricultural work machines using the optimized values for the work parameters and/or using the improved or optimized sequence of process steps in order to automatically perform the agricultural job (e.g., automatically operate an agricultural work machine to automatically perform harvesting, to automatically perform baling, etc.).

In one or some embodiments, the assistance system may select the predefined strategy that improves or optimizes work parameters and process steps depending on quality parameters describing the forage harvesting process. The quality parameters may be predefined or pre-definable depending on the strategy so that a certain quality of the harvested material may be ensured in a highly flexible manner.

In addition, the agricultural work machines may include one or more work units, wherein the mode of operation of the agricultural work machines and the one or more work units assigned to them are described by (or automatically controlled based on) the work parameters so that specific optimization of the quality of the harvested material is possible.

In one or some embodiments, the assistance system comprises at least one operating device (such as at least one computing device). The operating device (such as the computing device) may comprise at least one input and display unit (e.g., a touchscreen), a memory and data processing unit (such as at least one processing unit that comprises at least one processor). The operating device may be assigned to one or more of the agricultural work machines and/or a stationary unit. Further, the one or more of the operating devices may be configured to exchange data (e.g., such as automatically exchange data wired and/or wirelessly) with each another; it may then be ensured that a plurality of agricultural work machines forming the respective forage harvesting process chain may be integrated (such as automatically integrated) into the forage harvesting process (such as automatically performing any one, any combination, or all of the process steps in the determined sequence in the forage harvesting process) to be optimized and, in addition, simple use of the assistance system is possible.

In one or some embodiments, a high-quality optimization result may also be ensured in that the respective operating device obtains (such as automatically obtains) data from internal and/or external data sources, and that at least the storage and data processing unit assigned to the respective operating device may be partially or completely assigned to a data cloud. On the one hand, such a structure has the advantage that the optimization may be supported by a large amount of data and, on the other hand, the computing power of the assistance system is not overloaded despite the large amount of available data.

In order to be able to optimize a forage harvesting process comprehensively using the assistance system, one, some or as many process steps of the forage harvesting process and the agricultural work machines implementing the forage harvesting process may be recorded, in particular, the forage harvesting process may comprise one or more process steps (such as one or more automatically performed process steps) and the process steps (such as the automatically performed process steps) may comprise any one, any combination, or all of: decision to begin harvesting (such as automatically deciding to begin harvesting); mowing the crop (such as using at least one agricultural work machine to automatically mow the crop); turning the harvested material (such as using at least one agricultural work machine to automatically turn the harvested material); swathing the harvested material (such as using at least one agricultural work machine to automatically swath the harvested material); swath harvesting using a forage harvester (such as automatically swath harvesting using a forage harvester); swath harvesting using a baler (such as automatically swath harvesting using a baler); swath harvesting using loader wagon (such as automatically swath harvesting using loader wagon); collecting and removing harvested material bales (such as using at least one agricultural work machine to automatically collect and remove harvested material bales); and storing the harvested material (such as using at least one agricultural work machine to automatically store the harvested material). In this regard, in one or some embodiments, the assistance system may aid in the automatic operation of at least one agricultural work machine to perform one or more automatic steps in a designated sequence of process steps in performing the agricultural job.

In one or some embodiments, the assistance system is designed such that the forage harvesting process to be improved or optimized is described as an agricultural job, and the description of the agricultural job comprises the required process steps and the designated sequence of their execution, whereby the designated sequence of execution of the process steps forms the respective forage harvesting process chain (with the at least one agricultural work machine automatically performing one, some or all of the sequence of execution of the process steps). Such a structure may have the advantage that the optimization measures to be performed may be easily depicted in the assistance system, and a structured optimization of the forage harvesting process chain may then be implemented (such as automatically implemented).

In one or some embodiments, there may be great flexibility in the improvement or optimization of forage harvesting process chains if the assistance system is designed in such a way that it may optimize the use (such as the automatic use) of a wide variety of agricultural work machines, for example the use of mowing machines (e.g., mowers in order to automatically operate the mowers), haymaking machines (e.g., hay tedders in order to automatically operate the hay tedders), swathing machines (e.g., windrowers in order to automatically operate the windrowers), harvesting machines (e.g., forage harvesters in order to automatically operate the forage harvesters), balers and/or loader wagons, transport vehicles (e.g., tractors in order to automatically operate the tractors), transport vehicles, flatbed trailers, forklift trucks and compaction vehicles. Thus, because there is flexibility in the variety of potential machines to generate the sequence, the assistance system may select the particular sequence of the process steps in an improved or optimal manner.

In one or some embodiments, the field of application of the assistance system may be further expanded by the fact that the forage harvesting process chain may comprise storage media, such as feed silos and/or harvested material bales.

The flexibility of use of the assistance system may also be further increased in that the strategies saved in the assistance system may be specified by a user (e.g., an operator of the agricultural work machine) and/or may be suggested by the assistance system, wherein the saved strategies may be aimed at the respective intended use of the harvested material.

In one or some embodiments, the assistance system is such that the purposes of use of the saved strategies may comprise a variety of purposes of use, such as any one, any combination, or all of: biogas production from freshly harvested or ensiled harvested material; animal feed from freshly harvested or ensiled harvested material, wherein the animal feed may be differentiated in particular according to cattle fattening and milk production; or storage of the harvested material as hay. In this way, the assistance system may be configured to tailor the parameter(s) selected (used for automatic control of the agricultural work machines) and/or the process steps (one, some, or all of which to be automatically implemented). Thus, the process chain may be performed on a case-by-case basis as quality-oriented as necessary, which may ultimately save resources and reduce costs. Further, the selection by the assistance system of values for the work parameters and/or the sequence of the process steps may be tailored to one or both of the designated strategy(ies) and/or to the agricultural job.

In one or some embodiments, high-quality optimization of the forage harvesting process chain depending on the intended use of the harvested material may be achieved if one, some, or each of the strategies comprises one or more quality parameters, wherein each of the quality parameters defines the work result of the respective forage harvesting process chain and one or more of the quality criteria: fuel requirement (e.g., a minimum fuel requirement); throughput (e.g., a maximum throughput); total costs (e.g., minimum total costs); harvested material quality (e.g., maximum harvested material quality); harvested material loss (e.g., minimal harvested material loss); energy content of the harvested material (e.g., a maximum energy content of the harvested material); degree of soiling (e.g., a minimum degree of soiling); moisture of the harvested crop (e.g., an optimized moisture adapted to the intended use); crop yield (e.g., a maximum crop yield).

In one or some embodiments, the maintenance of the optimizable quality parameters may be achieved by defining limit values for the quality parameters and/or quality criteria assigned to the quality parameters, and the limit values may be stored (such as automatically stored) in the assistance system or transferred thereto.

In one or some embodiments, the intended use of the saved strategy may be directed to the use of the harvested material as freshly harvested material or as silage for biogas production, wherein the quality parameter may comprise the quality criterion of moisture and a predefined range (e.g., a value range of 55-70%) is specified for the moisture, one work parameter is the cutting length of the harvested material and the cutting length may be in a range of 4-10 mm (e.g., with the automatic implementation of this work parameter resulting in the agricultural work machine automatically controlling the process so that the cutting length may be in a range of 4-10 mm), one work parameter is the cutting time and the value for the cutting time may be selected such that a predetermined energy concentration (e.g., a high energy concentration) is achieved in the harvested material (e.g., with the automatic implementation of the value of this work parameter resulting in the agricultural work machine automatically controlling the cutting time), a high compaction of the harvested material is possible and the avoidance of incorrect fermentation is achieved, one work parameter comprises the cutting height of the mower and the value of the cutting height is proposed in a range of 50-80 mm (e.g., with the automatic implementation of the value of this work parameter resulting in the mower automatically controlling the process so that the cutting height is proposed in a range of 50-80 mm), it may be ensured that the harvested material has an optimum quality for biogas production which may enable a higher biogas yield.

In one or some embodiments, the intended use of the saved strategy may be directed to the use of the harvested material as freshly harvested material or as silage for animal feed, such as cattle fattening and milk production, wherein the quality criterion of moisture may be between 55 and 70%, one work parameter comprises the addition of an amount of silage additive which promotes the formation of lactic acid, one work parameter is the cutting length of the harvested material and the cutting length may be in a range of 4-25 mm (e.g., with the automatic implementation of this work parameter resulting in the agricultural work machine automatically controlling the process so that the cutting length is in the range of 4-25 mm), wherein a value for the cutting length may be proposed to be shorter the wetter the crop, one work parameter may comprise the cutting height of a mower and the value of the cutting height is proposed to be in a range of 50-80 mm (e.g., with the automatic implementation of this value of the work parameter resulting in the agricultural work machine automatically controlling the process so that the cutting height is in a range of 50-80 mm), it may be ensured that the harvested material has a high energy content, is easily digestible for cattle and may comprise a high proportion of lactic acid so that the cattle either experience an efficient weight gain in fattening or produce a high milk yield in milk production. In this context, it may be advantageous if the dry matter content of the harvested material is determined, such as by analyzing the harvested material and adding the amount of silage additive depending on the dry matter content, wherein an optimum wilting time may be determined for an optimum dry matter content.

In one or some embodiments, the intended use of the saved strategy may be directed to the use of the harvested material as hay, wherein the quality parameter moisture may be a maximum of 15%, so that it may be ensured that the harvested material may be sufficiently well compacted and, depending on whether the compaction takes place in the form of a bale of harvested material or in a silo, mold or rotting of the harvested material is avoided.

In one or some embodiments, the assistance system is such that the optimization of the process steps automatically proposes the omission or repetition of process steps (thereby determining the sequence of the process steps), wherein the repetition or omission of the process step(s) in the designated sequence may comprise turning the harvested material and/or the omission of the cracking of the harvested material in the process step of mowing when at least the quality criterion of moisture is either not yet or already within a permissible range. Process steps are omitted (such as automatically omitted) if, for example, the moisture of the harvested material has reached an acceptable range for storage. In this regard, the sequence of the process steps may be modified based on one or more criteria, such as sensor input. Conversely, this may mean that, for example, the turning process step may be repeated (such as automatically repeated) until the moisture of the harvested material has reached an acceptable range for storage (e.g., the agricultural work machine may, using a sensor, automatically determine the moisture of the harvested material; responsive to the determination of the moisture of the harvested material, the agricultural work machine may automatically repeat the turning process step until the determined moisture is within the acceptable range of storage). Such an embodiment may have at least the advantage that the harvested material is exposed to less mechanical stress, which may ultimately counteract harvested material loss due to less intensive shredding. In this regard, the sequence of the process steps may be dependent on one or more factors, thereby improving or optimizing the sequence of the process steps.

In one or some embodiments, the assistance system may be structured in such a way that the optimization of the values of respective work parameters comprises the optimization of the value of the raking height in the process steps of turning and swathing, and the value of the raking height may be suggested to be higher the worse the quality criterion of the degree of soiling. For example, the assistance system may automatically determine the value of the raking height, which in turn may be used to automatically control the agricultural work machine when automatically performing the process steps of turning and swathing. This may have the effect that the harvested material may be easier to digest due to the lower degree of contamination on the one hand, and may also be converted into biogas more efficiently in the biogas plant on the other hand. The same effects may also be achieved if, in another embodiment, the assistance system is designed in such a way that the optimization of the values for the work parameters of cutting height and cutting time in the process step of mowing is performed (such as automatically performed) at least depending on one or more of the quality criteria of degree of contamination and moisture, wherein the worse the quality criteria of degree of contamination and moisture, the higher the value of the cutting height and the later the value of the cutting time is selected. In this regard, responsive to automatically determining one or both of contamination or moisture, the assistance system may automatically determine values for the cutting height and/or the cutting time. Further, the agricultural work machine may be automatically controlled responsive to the automatic determination of the values for the cutting height and/or the cutting time.

In one or some embodiments, the assistance system is configured to automatically suggest a change of quality parameters and associated quality criteria of an activated strategy or a change of an activated strategy if the assistance system automatically recognizes that the quality parameters and/or the associated quality criteria of a selected strategy cannot be achieved, such as in the event of machine failure and/or an imminent bad weather phase. In turn, the changed quality parameters and/or the associated quality criteria of a selected strategy may be used for the automatic control of the agricultural work machine. In particular, this may have the advantage that, even under unfavorable conditions, the harvested material quality may still be acceptable for a specifically intended use, which may have to be changed.

In view of the fact that the quality of the harvested material may be influenced by each individual process step of a forage harvesting process chain, in one or some embodiments, the assistance system is configured to automatically define the type and scope of the subsequent process steps of the activated process strategy (in determining the sequence of process steps) depending on conditions of a preceding process step. In this way, crop quality deteriorating boundary conditions of a preceding process step may be counteracted by automatic adapted optimization in a subsequent process step (with one or both of the preceding process step or the subsequent process step being automatically performed). Conversely, it is also possible that in the event of very high crop quality due to very good external conditions, the measures of the subsequent process step may be reduced so that the costs of the overall process decreases (e.g., in the automatic implementation of the subsequent process step, costs may be reduced).

Referring to the figures, FIG. 1 schematically illustrates a forage harvesting process 1, wherein the depicted forage harvesting process 1 comprises a plurality of process steps 2, described in more detail below. In particular, the process steps 2 may include any one, any combination, or all of the following illustrated in FIG. 1: mowing 3; turning or tedding 4; swathing 5; swath harvesting using a forage harvester 6; swath harvesting using a baler 7; collection and removal of the harvested material bales 8; swath harvesting using a loader wagon 9; and storage 10 of the harvested material 16. For reasons of simplification, FIG. 1 also shows alternative process steps 2, which may be mutually exclusive in practice, such as swath harvesting using a forage harvester 6, swath harvesting using a baler 7, or swath harvesting using a loader wagon 9. As discussed herein, part or all of the process steps 2 disclosed herein may be automatically executed (such as automatically controlled by the work parameters and/or the process steps determined by the assistance system). Thus, the above may provide a list of potentially available process steps from which to choose (and also from which to generate a sequence of process steps in order to perform the agricultural job).

In one or some embodiments, the forage harvesting process 1 to be optimized may be described by the agricultural job 11 to be explained below and comprising an application-dependent selection of process steps 2 (from the potentially available process steps) and the sequence in which they are perform. Another process step 2 may be the decision about the start of harvesting 12 of the forage harvesting process 1. The process steps 2 describing the respective agricultural job 11 may hereinafter be referred to as the forage harvesting process chain 13.

In the embodiment depicted according to FIG. 1, the process step 2 mowing 3 is performed by a tractor 14 with front and side mowers 15, wherein the harvested material 16 is deposited in a single harvested material swath 17. It is within the scope of the invention that the three-part mower 15 may also be designed as only a one-part or two-part mower 15 and may form several crop swaths 17. In addition, the harvested material 16 may also be deposited in wide deposits 18 on the field soil 19 in process step 2 Mowing 3.

The process step 2 turning or tedding 4 may be implemented using a haymaking machine 20, also known as a turner or tedder, pulled by a tractor 14 or mounted thereon, and may be downstream (e.g., performed after) of process step 2 mowing 3, wherein in this case, the harvested material 16 may be deposited in a wide deposit 18 in process step 2 mowing 3. Process step 2 turning or tedding 4 may be performed once or several times, depending on the moisture of the harvested material 16 deposited in a wide deposit 18. In this regard, the haymaking machine, in its at least partly or fully automatic operation, may automatically sense (via a moisture sensor) the moisture of the harvested material 16 deposited in the wide deposit 18, then may automatically determine whether to perform the process step 2 of turning or tedding 4 again (depending on comparing the value of the actual moisture from the moisture sensor with a designated value for the moisture of the harvested material 16, as work parameter, with the comparison determining whether to perform the process step 2 of turning or tedding 4 again), and responsive to determining to perform the process step 2 of turning or tedding 4 again, automatically control its movement to perform the process step 2 of turning or tedding 4 again.

If the harvested material 16 has been deposited in a wide deposit 18 on the field soil 19, the forage harvesting process chain 13 may comprise process step 2 of swathing 5. In embodiment depicted in FIG. 1, process step 2 of swathing 5 may be performed by a tractor 14-windrower 21 combination, wherein the windrower 21 is designed as a four-rotor swather and deposits the harvested material 16 in a single harvested material swath 17. However, the use of single-rotor or multi-rotor swathers is also contemplated here, which may deposit the harvested material 16 in one or more harvested material swaths 17 on the field soil 19.

In a first embodiment, the harvested material swath 17 may be picked up by a forage harvester 22, shredded in a manner known per se and transferred to a transport wagon 23 pulled by a tractor 14. Alternatively, the harvested material swath 17 may be picked up by a loader wagon 24 pulled by a tractor 14. Loader wagons 24 are usually equipped with a collecting device designed as a pick-up and, depending on the equipment, may shred the picked-up harvested material 16 and then transfer it to a certain extent pre-compacted to the actual transport container. Another alternative may be to pick up the harvested material swath 17 by a baler 25 pulled by a tractor 14, such as designed as a so-called square baler 25, wherein the harvested material 16 may then be deposited as a harvested material bale 26 on the field soil 19. This process step 2 is generally followed by process step 2 of collection and removal of the harvested material bales 8, wherein flatbed trailers 27 and forklifts 28 such as tractors 14 with front loaders or so-called telescopic loaders, may be generally used to pick up and transfer the harvested material bales 26.

Process step 2 of storage 10 of the harvested material may, on the one hand, include the storage of the harvested material bales 26. On the other hand, the harvested material 16 picked up by a transport wagon 23 or a loader wagon 24, for example, may be stored in a silo 29, wherein a flat silo is illustrated in FIG. 1. The harvested material 16 may generally be stored in a flat silo in such a way that the loading wagon 23 or transport wagon 24 pulled by the tractor 14 delivers the harvested material 16 into the silo 29, where a compaction vehicle 30 compacts the harvested material 16 in a manner known per se by rolling it over and pushing it together several times.

In one or some embodiments, the respective tractor 14, the mower 15, the haymaking machine 20, the windrower 21 (interchangeably termed swather), the forage harvester 22, the transport wagon 23, the loader wagon 24, the baler 25, the flatbed trailer 27, the forklift 28 and the compaction vehicle 30 may form the agricultural work machines 31 of the forage harvesting process 1 to be controlled/optimized and the forage harvesting process chain 13 describing it. It is contemplated that each of the agricultural work machines 31 may be designed to be self-propelled, wherein it is also within the scope of the invention that the agricultural work machines 31 may realize the respective process step 2 autonomously (e.g., without a driver). In this regard, one, some or each of the disclosed agricultural work machines 31 may be automatically operated to perform any of the operations described herein regarding any agricultural job disclosed herein or any forage harvesting process 1 disclosed herein. This is illustrated in the figures in that one, some, or each of the agricultural work machines 31, such as any one, any combination, or all of the following may include computing device 39: the respective tractor 14, the mower 15, the haymaking machine 20, the windrower 21, the forage harvester 22, the transport wagon 23, the loader wagon 24, the baler 25, the flatbed trailer 27, the forklift 28 and the compaction vehicle 30. In this manner, one, some or each of the agricultural work machines 31 may receive one or both of the optimized values for the work parameters 35 and optimized process steps 2, and using the computing device 39, automatically perform one or more operations of the respective agricultural work machines 31, as discussed herein.

The forage harvesting process 1 may therefore be composed of the interaction of the harvested material 16 to be harvested with the process steps 2 forming the forage harvesting process chain 13 and the necessary agricultural work machines 31 assigned to each of them. The agricultural work machines 31 may comprise work units not yet described in detail here. The mode of operation of the agricultural work machines 31 and the work units assigned to them in each case may be controlled (such as automatically controlled) by changing the work parameters 35 assigned to them in each case and yet to be described.

In one or some embodiments, the forage harvesting process 1 may be controlled (such as optimized) in accordance with one embodiment using an assistance system 32 to be described in detail, wherein the assistance system 32 is configured to support a user 33 in controlling (e.g., optimizing) the agricultural job 11 describing the forage harvesting process 1. In one or some embodiments, the control or optimization of the forage harvesting process 1 may comprise at least the planning and/or execution of the forage harvesting process chain 13 effecting the implementation of the agricultural job 11, wherein the forage harvesting process chain 13 comprises, as described, a plurality of process steps 2 (selected in a specified sequence from the plurality of available process steps) and a plurality of agricultural work machines 31 which process (such as automatically process) the agricultural job 11 in the specified sequence. In one or some embodiments, the assistance system 32 is further configured to optimize the execution of the agricultural job 11 according to specified strategies 34$a$ . . . $n$, wherein the specified strategies 34$a$ . . . $n$ are saved in the assistance system 32 and/or are transferred thereto, and wherein the assistance system 32 generates optimized values for the work parameters 35 and optimized sequence of process steps 2 for the forage harvesting process chain 13 and the agricultural work machines 31 forming it using the specified strategies 34$a$ . . . $n$. The specified strategies 34$a$ . . . $n$ may be structured in such a way that they determine the optimized values for work parameters 35 and the optimized sequence process steps 2 depending on the quality parameters 36 describing the forage harvesting process 1 and explained in more detail below, and the quality parameters 36 are specified or specifiable depending on the strategy. The quality parameters 36 may be specified in that each strategy 34a . . . n may be assigned very specific quality parameters 36. The quality parameters 36 may also be specified in that, for example, a user 33 may establish very specific quality parameters 36 for a specific strategy 34a . . . n.

As illustrated in FIG. 1, the assistance system 32 may include a computing device 39. Computing device 39 may include at least one processor 54 and at least one memory 55 in communication with the at least one processor 54. In one or some embodiments, the processor 54 may comprise a microprocessor, controller, PLA, or the like. Similarly, the memory 55 may comprise any type of storage device (e.g., any type of memory). Though the processor 54 and the memory 55 are depicted as separate elements, they may be part of a single machine, which includes a microprocessor (or other type of controller) and a memory. Alternatively, the processor 54 may rely on the memory 55 for all of its memory needs. The memory 55 may comprise a tangible computer-readable medium that include software that, when executed by the at least one processor 54 is configured to perform any one, any combination, or all of the functionality described herein regarding any computing device.

The processor 54 and the memory 55 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. As discussed herein, the assistance system 32 may be configured, using computing device 39, to receive and/or access one or more inputs (e.g., specifiable strategy 34a . . . n and/or quality parameter(s) 36), and generate one or more outputs (e.g., process step(s) and/or work parameter(s) 35).

Figure 2:
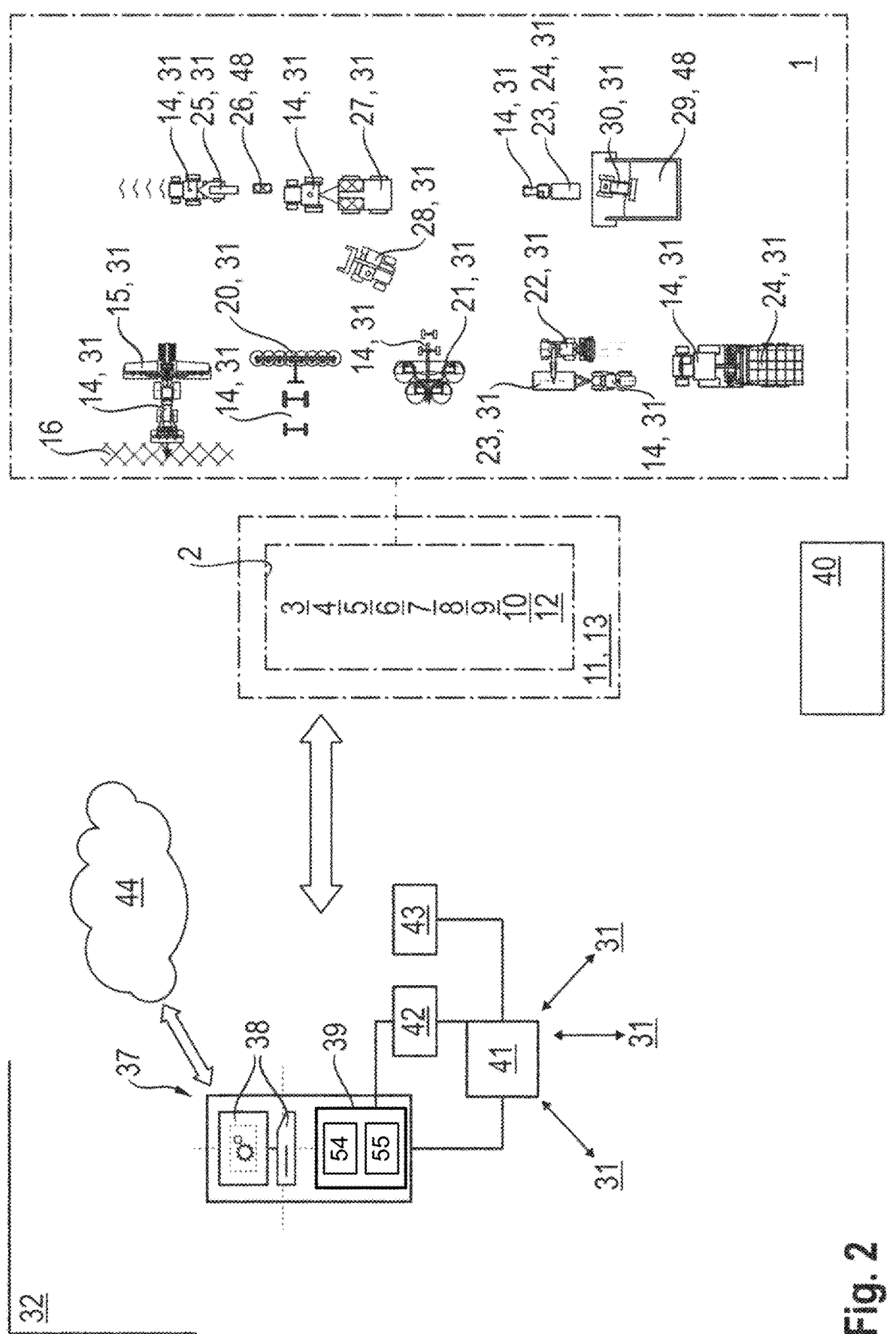
FIG. 2 illustrates details of the assistance system according to one embodiment of the invention.

FIG. 2 describes additional details of the assistance system 32. The assistance system 32 may comprise at least one operating device 37, wherein the operating device 37 may be formed by at least one input and display unit 38 (e.g., a touchscreen) and computing device 39, which may comprise at least one processor 54 and at least one memory 55, as discussed above. In one or some embodiments, the operating device 37 may be assigned to one or more of the agricultural work machines 31 (interchangeably termed agricultural production machine) describing the forage harvesting process 1 and/or a stationary unit 40, wherein one or more of the operating devices 37 may be configured to exchange data 41 with one another (e.g., wired and/or wirelessly). The respective operating device 37 may also be configured such that it obtains data 41 from an internal data source 42 associated with the computing device 39 and/or one or more external data sources 43. In one or some embodiments, the computing device 39 assigned to the respective operating device 37 may be partially or completely assigned to a data cloud 44. As previously described, the forage harvesting process 1 comprises one or more process steps 2. Specifically, the process steps 2 may comprise one or more of the process steps 2, including any one, any combination, or all of: decision to start harvesting 12; mowing 3 the harvested material 16; turning 4 the harvested material 16; swathing 5 the harvested material 16; swath harvesting using a forage harvester 6; swath harvesting using a baler 7; swath harvesting using a loader wagon 9; collection and removal of harvested material bales 8; and storage 10 of harvested material 16.

Finally, the forage harvesting process 1 to be controlled or optimized is described as an agricultural job 11, as previously explained, wherein the description of the agricultural job 11 may include the required process steps 2 and the sequence in which they are performed. The sequence of the performance of the process steps 2 to be performed may also form the respective forage harvesting process chain 13. Depending on the type of forage harvesting process 1 to be controlled or optimized, the forage harvesting process chain 13 defining the respective agricultural job 11 may comprise a plurality of agricultural work machines 31 such as any one, any combination, or all of: mowers 15; haymaking machines 20 (e.g., hay tedders); windrowers 21; harvesting machines (e.g., forage harvesters 22); balers 25 and/or loader wagons 24; transport vehicles (e.g., tractors 14, transport wagons 23, and/or flatbed trailers 27); forklifts 28; and compaction vehicles 30. In addition, the forage harvesting process chain 13 may comprise the storage 10 of the harvested material 16, wherein the storage 48 may be in the form of harvested material bales 26, or the storage 48 may be in silos 29. In the following, harvested material bales 26 and silos 29 may be jointly referred to as storage media.

Figure 3:
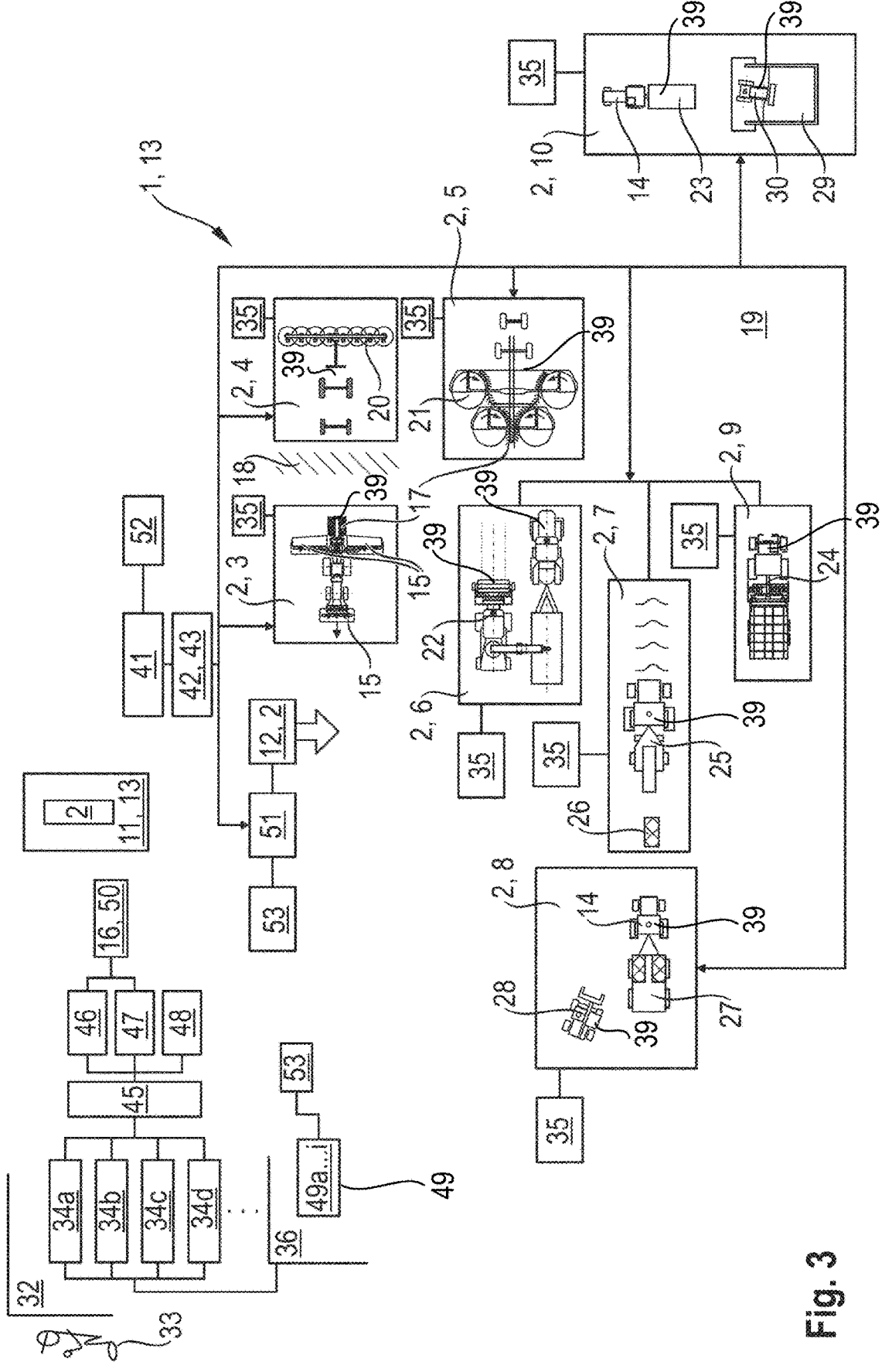
FIG. 3 illustrates further details of the assistance system according to FIG. 2.

According to FIG. 3, the strategies 34a . . . n saved in the assistance system 32 may be specified by a user 33 and/or suggested by the assistance system 32. In one or some embodiments, the saved strategies 34a . . . n may be directed to the respective intended use 45 of the harvested material 16. In one or some embodiments, the saved strategies 34a . . . n may comprise typical intended uses 45, such as the use of the harvested material 16 for:

biogas production 46 from freshly harvested or ensiled harvested material 16;

animal feed 47 from freshly harvested or ensiled harvested material 16, wherein the animal feed 47 may comprise in particular cattle fattening and milk production; or storage 10 of the harvested material 16 as hay.

Further, each of the predeterminable strategies 34a . . . n may comprise one or more quality parameters 36, wherein one, some or each of the quality parameters 36 may define the work result of the respective forage harvesting process chain 13 and may include any one, any combination, or all of the quality criteria 49 of:

fuel requirement 49a (e.g., a minimum fuel requirement);

throughput 49b (e.g., a maximum throughput);

total costs 49c (e.g., minimum total costs);

harvested material quality 49d (e.g., maximum harvested material quality);

harvested material loss 49e (e.g., minimal harvested material loss);

energy content 49f of the harvested material 16 (e.g., a maximum energy content);

degree of soiling 49*g* (e.g., a minimum degree of soiling); the moisture 49*h* of the harvested material 16 (e.g., an optimized moisture adapted to the intended use 45); or crop yield 49*i* (e.g., a maximum crop yield).

As shown in FIG. 3, the assistance system 32 may perform one or more automatic operations, such as generate the sequence of process step(s) 2 and the value(s) for the work parameter(s) 35 for the agricultural job, and transmit the relevant sequence of process step(s) 2 and relevant value(s) for the work parameter(s) 35 to the respective machine(s) (e.g., the assistance system 32 sends to a first respective machine first sequence of process step(s) 2 with first set of value(s) for work parameter(s) 35 (in order for the first respective machine to perform one or more automatic operations in performing the sequence of first process step(s) 2 using the first set of value(s)); the assistance system 32 sends to a second respective machine second sequence of process step(s) 2 with second set of value(s) for work parameter(s) 35 (in order for the second respective machine to perform one or more automatic operations in performing the sequence of second process step(s) 2 using the second set of value(s)); etc.). This is illustrated in FIG. 3, in which the various machines receive the sequence of process steps 2 and the values of work parameters 35. In this way, the assistance system 32 may coordinate the sequence of the process steps 2 (e.g., removing process step(s) 2 that may be unnecessary; adding process step(s) 2 that may be necessary; etc.) so that the one or more machines may work in concert efficiently. Further, the assistance system 32 may send the values for the relevant work parameters 35 so that the one or more machines may operate efficiently (and at least partly automatically) in performing the relevant process step(s) 2 to be performed by the respective machine. In this regard, the assistance system 32 may operate as a central controller, with intelligence being centralized, and with automatic operation being resident in the one or more machines to perform the automatic operations remotely. Alternatively, the assistance system 32 may be resident in one or more of the machines, with the sequence of process step(s) 2 and the value(s) for work parameter(s) 35 being transmitted to other machine(s) to perform the agricultural job. In this regard, the sequence of process step(s) 2 and/or the value(s) for work parameter(s) 35 generated by the assistance system 32 may be used for automatic operation (either by a machine remote from the assistance system and/or by a machine that has resident therein the assistance system 32).

Further, according to FIG. 3, a typical forage harvesting process 1 may be structured such that the assistance system 32 is configured to first automatically determine an optimum time for the start of harvesting 12, wherein the start of harvesting 12 may form the first process step 2 defining the respective forage harvesting process chain 13. In one or some embodiments, the start of harvesting 12 may depend on a plurality of decision criteria 51 known per se, wherein typical decision criteria 51 may include any one, any combination, or all of: weather data; a suitable time for the start of harvesting; the growth stage of the harvested material 16; the composition of the harvested material 16; the altitude at which the harvested material 16 is to be harvested; the soil moisture; or the moisture of the harvested material 16 itself. The decision criteria 51 may be determined from data 41 which the assistance system 32 obtains from internal or external data sources 42, 43. It is contemplated that the data 41 may also be determined by sensor systems 52 known per se and not described in detail here. The assistance system 32 is configured to automatically analyze the obtained data 41 according to the decision criteria 51 defined depending on the application and, as a result, automatically suggests the time of the start of harvesting 12. In the simplest case, limit values 53 for the decision criteria 51 may be stored in the assistance system 32.

The actual process of harvesting may begin with the process step 2 of mowing 3. Depending on the number and equipment level of the mowers 15 to be used, the work parameters 35 may include any one, any combination, or all of the following work parameters 35: the cutting height; the decision as to whether a conditioner should be used or not; the rotational speed of the rotating mower blades and the rotational speed of the conditioner; the blade condition of the mower blades; and the contact pressure of the mowers 15 on the field soil 19. Values for each of these work parameters 35 may influence the previously described quality parameters 36 of the harvested material 16. For example, a value for an excessively low cutting height may result in the quality criterion of Degree of soiling 49*g* (e.g., contamination) being above a permissible limit value 53. Values of the work parameters 35 may be automatically determined by the assistance system 32 from data 41, which the assistance system 32 may obtain from internal or external data sources 42, 43. It is contemplated that the data 41 may also be automatically determined by sensor systems 52, which are known per se and are not described in detail here and which may be assigned to the respective mower 15. The assistance system 32 may automatically analyze the obtained data 41 according to the quality parameters 36 defined depending on the application and, as a result, may automatically suggest optimized values of work parameters 35 for the process step 2 of mowing 3. In the simplest case, limit values 53 for the quality parameters 36 may be saved in the assistance system 32. In this regard, the assistance system 32 may automatically determine values for various parameters, such as work parameters 35, in order for the values of the work parameters 35 to be used to automatically control mowers 15 in automatically performing the process step 2 of mowing 3.

As previously described, the mowers 15 may deposit the harvested material 16 in one or more harvested material swaths 17 or in a wide deposit 18 on the field soil 19. In the case of a wide deposit 18, the next process step 2 may be turning 4. In so doing, the harvested material 16 may be whirled up and redeposited in a wide deposit 18 so that the harvested material 16 is more or less evenly exposed to wind and sun in order to accelerate the drying of the harvested material 16.

The work parameters 35 of the employed haymaking machines 20 may be any one, any combination, or all of the work parameters 35 of: drying time; raking height; spreading angle; travel route; and travel speed. In addition, assistance system 32 may automatically consider environmental influences such as any one, any combination, or all of: soil moisture; wind speed; and air humidity. For example, a value for a raking height that is too low may result in the quality criterion degree of soiling 49*g* being above a permissible limit value 53. The values for the work parameters 35 may be determined from data 41 which the assistance system 32 may automatically obtain from internal or external data sources 42, 43. It is contemplated the data 41 may also be determined by sensor systems 52, which are known per se and are not described in detail here and which may be assigned to the respective haymaking machine 20. The assistance system 32 may automatically analyze the obtained data 41 according to the quality parameters 36 defined depending on the application and, as a result, automatically suggests optimized values for work parameters 35 for the process step 2 of turning 4. In the simplest case, limit values 53 for the quality parameters 36 may be saved in the assistance system 32. Due to the fact that turning 4 (which is an example of tedding) serves the sole purpose of accelerating the drying of the harvested material 16, one value for a work parameter 35 here may also include the number of repetitions of process step 2 of turning 4 or the complete omission of this process step 2. In this regard, values for the work parameters 35, automatically determined by the assistance system, may be used to automatically control the haymaking machines 20 (e.g., the assistance system 32 automatically implements the control of the haymaking machine 20 without operator input; or the assistance system 32 may automatically output the value on the touchscreen for the operator to approve the value of the work parameter(s) 35 and responsive to the approval, automatically implemented to control the haymaking machine 20 accordingly).

If the harvested material 16 is to be placed in a wide deposit 18 on the field soil 19, swathing 5 must follow as another process step 2. As previously described, it may depend on the type of windrower 21 whether one or more harvested material swaths 17 are deposited on the field soil 19. The one or more work parameters 35 of the respective employed windrower 21 may be any one, any combination, or all of: the drying time; the raking height; the inclination of the respective swath rotor; the route; and the driving speed. In addition, the assistance system 32 may consider one or more environmental influences, such as any one, any combination, or all of: soil moisture; wind speed; and air humidity. For example, even in swathing 5, a value of a raking height that is too low may result in the quality criterion degree of soiling 49g being above a permissible limit value 53. The assistance system 32 may automatically determine the values of the work parameters 35 from data 41, which the assistance system 32 may obtain from internal or external data sources 42, 43. It is contemplated that the data 41 may also be determined by sensor systems 52, which are known per se and are not described in detail here and which may be assigned to the respective windrower 21. The assistance system 32 may automatically analyze the obtained data 41 according to the quality parameters 36 defined depending on the application and, as a result, may automatically suggests optimized values for the work parameters 35 (which may be automatically implemented to control the windrower 21 and/or may be output on the touchscreen for the operator to approve and responsive to the approval, automatically implemented to control the windrower 21) for the process step 2 of swathing 5. In the simplest case, limit values 53 for the quality parameters 36 are saved in the assistance system 32. In this regard, the work parameters 35, automatically determined by the assistance system, may be used to automatically control the windrowers 21.

Regardless of how the harvested material 16 was formed into a harvested material swath 17, it may be finally harvested, wherein a distinction may be made here between the process steps 2 of swath harvesting using a forage harvester 6, swath harvesting using a baler 7, and swath harvesting using a loader wagon 9. All three harvesting process steps 2 have in common that the values for the work parameters 35 may be automatically determined by the assistance system 32 from data 41, which the assistance system 32 may obtain from internal and/or external data sources 42, 43. It is also contemplated that the data 41 may also be determined by sensor systems 52 known per se and not described in detail here, which may be assigned to any one, any combination, or all of the respective forage harvester 22 and associated tractor-transport wagon combination 14, 23, the respective baler 25 or the respective loader wagon 24. The assistance system 32 may automatically analyze the obtained data 41 according to the quality parameters 36 defined depending on the application and, as a result, automatically suggest optimized values for the work parameters 35 for the process steps 2 of any one, any combination, or all of swath harvesting using a forage harvester 6, swath harvesting using a baler 7, and swath harvesting using a loader wagon 9. In the simplest case, limit values 53 for the quality parameters 36 are saved in the assistance system 32. With swath harvesting using a forage harvester 6, the one or more work parameters 35 may be, for example, any one, any combination, or all of: the route; the chop length; the degree of shredding of the harvested material 16; and the amount of silage additive to be introduced. With swath harvesting using a baler 7, the one or more work parameters 35 may be, for example, any one, any combination, or all of: the bale size; the bale density; the amount of silage additive to be introduced; and the storage location of the harvested material bales 26. With swath harvesting using a loader wagon 9, the one or more work parameters 35 may, analogous to the forage harvester 22, be any one, any combination, or all of: the route; the chop length; the degree of shredding of the harvested material 16; and the quantity of silage additive to be introduced. In this regard, the values of the work parameters 35, automatically determined by the assistance system 32, may be used to automatically control swath harvesting using an agricultural work machine 31, such as forage harvester 6, baler 7, or loader wagon 9 (e.g., the assistance system 32 may automatically determine the work parameters 35, after which (either automatically or with operator approval), the work parameters 35 may be used to automatically control an agricultural work machine 31).

Process step 2 of swath harvesting using a baler 7 may be followed by process step 2 of collecting and transporting the harvested material bales 8. Here, the work parameters 35 may be essentially limited to optimized driving over the field soil 19 in order to collect the harvested material bales 26 with as few rollovers as possible. However, even in this process step 2, the values for the work parameters 35 may be automatically determined by the assistance system 32 from data 41 that the assistance system 32 automatically obtains from internal and/or external data sources 42, 43. Here too, it is contemplated that the data 41 may also be determined by sensor systems 52, which are known per se and are not described in detail here, which may be assigned to the respective forklift 28 and associated tractor-flatbed trailer combination 14, 27. The assistance system 32 may automatically analyze the obtained data 41 according to the quality parameters 36 defined depending on the application and, as a result, automatically suggests optimized values for the work parameters 35 for the process steps 2 of collecting and transporting the harvested material bales 8. In the simplest case, limit values 53 for the quality parameters 36 are saved in the assistance system 32. In this regard, the values for the work parameters 35, automatically determined by the assistance system 32, may be used to automatically control agricultural work machine 31 to at least partly automatically collect and transport the harvested material bales 8 (either fully automatically or automatically responsive to operator approval).

Another process step 2 of the forage harvesting process chain 13 may be the storage 10 of the harvested material 16 in a silo 29. Here, the work parameters 35 may essentially be limited to optimized compaction (e.g., predetermined compaction) of the harvested material 16 in the silo 29.

However, even in this process step 2, the values for the work parameters 35 may be automatically determined by the assistance system 32 from data 41 that the assistance system 32 automatically obtains from internal or external data sources 42, 43. Here too, it is contemplated that the data 41 may also be determined by sensor systems 52, which are known per se and are not described in detail here, which may be assigned to the respective compaction vehicle 30 and associated tractor-transport wagon combination 14, 23. The assistance system 32 analyzes the obtained data 41 according to the quality parameters 36 defined depending on the application and, as a result, suggests optimized values for work parameters 35 for the process steps 2 of storage 10 of the harvested material 16. In the simplest case, limit values 53 for the quality parameters 36 are saved in the assistance system 32. In this regard, the values for the work parameters 35, automatically determined by the assistance system 32, may be used to automatically control agricultural work machine 31 to at least partly automatically store the harvested material 16 in a silo 29 (either fully automatically or automatically responsive to operator approval).

The assistance system 32 may also be automatically configured such that limit values 53 for the quality parameters 36 and/or the quality criteria 49 associated with the quality parameters 36 are defined, and the limit values 53 are saved in the assistance system 32 or transferred thereto.

If the intended use 45 of the saved strategy 34a . . . n is directed towards the use of the harvested material 16 as fresh harvested material 16 or as silage 50 for biogas production 46, a quality parameter 36 may comprise the quality criterion of moisture 49h, wherein a value range of 55-70% is specified for the moisture 49h so that the harvested material 16 has an optimum dry matter content of 30 to 45% for fermentation. Furthermore, one work parameter 35 may be the chop length of the harvested material 16, wherein the cutting length may preferably be in a range of 4-10 mm, since optimum bacterial conversion of the harvested material 16 into biogas may be ensured at these chop lengths. In addition, these cutting lengths result in a homogeneous substrate quantity. Another work parameter 35 in this context may be the cutting time, wherein the cutting time may be selected in such a way that a high energy concentration in the harvested material 16 may be ensured, a high compaction of the harvested material 16 may be possible, and the avoidance of faulty fermentations may be achieved. In addition, one work parameter 35 may include the cutting height of a mower 15, wherein the cutting height may be in a range of 50-80 mm so that a low degree of soiling of the harvested material 16 may be ensured, and at the same time damage to the turf is avoided. In this regard, values for the work parameters 35, automatically determined by the assistance system 32, may be used to automatically control at least one machine responsive (e.g., value for the cutting length being used for automatically controlling the cutting length and/or value for the cutting height being used for automatically controlling the cutting height of the mower 15) to the determination that the use of the harvested material 16 is as fresh harvested material 16 or as silage 50 for biogas production 46 (either fully automatically or automatically responsive to operator approval).

If the intended use 45 of the saved strategy 34a . . . n is directed towards the use of the harvested material 16 as fresh harvested material 16 or as silage 50 for animal feed 47, in particular cattle fattening and milk production, the quality parameter 36 comprises the quality criterion of moisture 49h, and wherein a value range of 55-70% is specified for the moisture 49h, one work parameter 35 may include the addition of an amount of silage additive which promotes the formation of lactic acid, one work parameter 35 is the cutting length of the harvested material 16 and the cutting length is preferably in a range of 4-25 mm, wherein the drier the harvested material 16, the shorter the cutting length is proposed, one work parameter 35 may include the cutting height of a mower 15 and the cutting height is proposed in a range of 50-80 mm. In this context, it may be advantageous if the dry matter content of the harvested material 16 is determined, such as by automatically analyzing the harvested material 16 and adding (such as automatically adding) the amount of silage additive depending on the dry matter content, wherein an optimum wilting time may be determined for an optimum dry matter content. In this regard, the values for the work parameters 35, automatically determined by the assistance system 32, may be used to automatically control at least one machine (e.g., value for the cutting length being used for automatically controlling the cutting length and/or value for the cutting height being used for automatically controlling the cutting height) responsive to the determination that the use of the harvested material 16 is as fresh harvested material 16 or as silage 50 for animal feed 47 (either fully automatically or automatically responsive to operator approval).

If the intended use 45 of the saved strategy 34a . . . n is aimed at using the harvested material 16 as hay, the quality parameter 36 may comprise the quality criterion of moisture 49h, and wherein a maximum value of 15% is specified for the moisture 49h.

In addition, the assistance system 32 may be configured such that during the optimization of the process steps 2 to be performed, that the assistance system 32 automatically proposes the omission or repetition of process steps 2, for example that the repetition or omission of the process step 2 comprises automatically turning 4 the harvested material 16 and/or the automatically omitting of the cracking of the harvested material 16 in the process step 2 of mowing 3 when at least the quality criterion of moisture 49h is either not yet or already within a permissible range. In this regard, the assistance system 32 may be configured to automatically determine which process steps 2 to perform (as part of a designated sequence), and responsive to this determination, an at least partly automatic implementation (e.g., either without operator approval or responsive to operator approval) of the determined sequence of process steps is performed (e.g., responsive to automatically determining that the moisture 49h is not yet within a permissible range, automatically turning 4 the harvested material 16 in the process step 2 of mowing 3; and/or responsive to automatically determining that the moisture 49h is within the permissible range, automatically omitting of the cracking of the harvested material 16 in the process step 2 of mowing 3).

As previously described, the degree of contamination of the harvested material 16 may be kept low in particular when the optimization of values of the work parameters 35 comprises the optimization of the value of the raking height in the process steps 2 of turning 4 and swathing 5, and the value of the raking height is suggested to be higher the worse the quality criterion of the degree of soiling 49g. In this regard, the determination by the assistance system 32 of the values of the work parameters 35 may be used to automatically control at least one machine.

As previously described, the degree of contamination of the harvested material 16 (e.g., crop) may be kept low in that the optimization of the work parameters 35 of cutting height and cutting time in the process step 2 of mowing 3 is performed (such as automatically performed) at least depending on one or more of the quality criteria 49 of degree of soiling 49*g* (e.g., contamination) and moisture 49*h*, wherein the worse the quality criteria 49 of degree of soiling 49*g* and moisture 49*h*, the higher the value of the cutting height and the later the cutting time is selected. In this regard, the determination by the assistance system 32 of the values of the work parameters 35 may be used to automatically control the mower 15.

Furthermore, the assistance system 32 may be configured to automatically suggest a change of quality parameters 36 and associated quality criteria 49 of an activated strategy 34*a* . . . *n* or a change of an activated strategy 34*a* . . . *n* responsive to the assistance system 32 automatically recognizing that the quality parameters 36 and/or the associated quality criteria 49 of a selected strategy 34*a* . . . *n* are not achievable, such as in the event of machine failure and/or an imminent bad weather phase.

In addition, depending on the conditions of a preceding process step 2, the assistance system 32 may be configured to automatically define the type and/or scope of the following process steps 2 of the activated process strategy 34*a* . . . *n*.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

| List of Reference Numbers | |
| --- | --- |
| 1 | Forage harvesting process |
| 2 | Process step |
| 3 | Mowing |
| 4 | Turning/tedding |
| 5 | Swathing |
| 6 | Swath harvesting using a forage harvester |
| 7 | Swath harvesting using a baler |
| 8 | Collection and removal of the bales |
| 9 | Swath harvesting using a loader wagon |
| 10 | Storage of harvested material |
| 11 | Agricultural job |
| 12 | Start of harvesting |
| 13 | Forage harvesting process chain |
| 14 | Tractor |
| 15 | Mower |
| 16 | Harvested material |
| 17 | Harvested material swath |
| 18 | Wide deposit |
| 19 | Field soil |
| 20 | Haymaking machine |
| 21 | Windrower |
| 22 | Forage harvester |
| 23 | Transport carriages |
| 24 | Loader wagon |
| 25 | Baler |
| 26 | Harvested material bales |
| 27 | Flatbed trailer |
| 28 | Forklift |
| 29 | Silo |
| 30 | Compaction vehicle |
| 31 | Agricultural production machine |
| 32 | Assistance system |
| 33 | User |

-continued

| List of Reference Numbers | |
| --- | --- |
| 34a . . . n | Specifiable strategy |
| 35 | Work parameter |
| 36 | Quality parameter |
| 37 | Operating device |
| 38 | Input and display unit |
| 39 | Computing device |
| 40 | Stationary unit |
| 41 | Data |
| 42 | Internal data source |
| 43 | External data source |
| 44 | Data cloud |
| 45 | Intended use |
| 46 | Biogas production |
| 47 | animal feed |
| 48 | Storage |
| 49 | Quality criteria |
| 50 | Silage |
| 51 | Decisive criterion |
| 52 | Sensor system |
| 53 | Limit value |
| 54 | Processor |
| 55 | Memory |

The invention claimed is:

1. An assistance system configured to control a forage harvesting process, the assistance system comprising:
   at least one memory; and
   at least one processor in communication with the memory, wherein the at least one processor is configured to:
   perform one or both of planning or execution of a forage harvesting process chain that is used for an agricultural job, wherein the agricultural job describes the forage harvesting process, wherein the forage harvesting process chain comprises a plurality of process steps and a plurality of agricultural work machines which process the agricultural job in a specified sequence, the performing of the one or both of the planning or the execution of the forage harvesting process chain by:
   accessing at least one specified strategy from a plurality of specified strategies; and
   generate, based on the at least one specified strategy and tailored to the agricultural job, values for work parameters and a sequence of process steps for the forage harvesting process chain and the agricultural work machines; and
   wherein the values for the work parameters and the sequence of the process steps are used for at least partly automatic control of one or more of the agricultural work machines in performing the agricultural job.

2. The assistance system of claim 1, wherein the at least one specified strategy is indicative of optimized work parameters and optimized process steps depending on one or more quality parameters describing the forage harvesting process;
   wherein the at least one processor is configured to access the one or more quality parameters that are specified or specifiable depending on the at least one specified strategy; and
   wherein the assistance system is configured to generate the values for the work parameters and the sequence of the process steps based on the one or more quality parameters.

3. The assistance system of claim 2, wherein the agricultural work machines comprise work units;
   wherein a mode of operation of the agricultural work machines and each of the work units assigned to a respective work machine is described by the work parameters generated by the assistance system; and wherein the values of the work parameters are used to automatically change the mode of operation of one or more of the agricultural work machines.

4. The assistance system of claim 1, further comprising at least one input and display unit;

wherein the at least one processor is part of an operating device;

wherein the operating device is assigned to one or both of: at least one agricultural work machine; or a stationary unit; and wherein the operating device and another operating device are configured to exchange data with one another.

5. The assistance system of claim 4, wherein one or both of the operating device or the another operating device is configured to obtain data from one or both of internal data sources or external data sources; and wherein at least a part of storage associated with the one or both of the operating device or the another operating device is assigned to a data cloud.

6. The assistance system of claim 1, wherein the forage harvesting process comprises one or more process steps;

wherein a plurality of available process steps comprise one or more of: decision to start harvesting; mowing harvested material; turning the harvested material; swathing the harvested material; swath harvesting using a forage harvester; swath harvesting using a baler; swath harvesting using a loader wagon; collection and removal of harvested material bales; or storage of harvested material; and wherein the assistance system is configured to select the sequence of the process steps from the plurality of available process steps.

7. The assistance system of claim 1, wherein the at least one processor is configured to generate the sequence of the process steps that comprises a plurality of separate agricultural work machines to perform the sequence of the process steps that forms a respective forage harvesting processing chain; and wherein the at least one processor is configured to generate the values for the work parameters for automatic control of the plurality of separate agricultural work machines to perform the sequence of the process steps to perform the respective forage harvesting processing chain.

8. The assistance system of claim 7, wherein the plurality of agricultural work machines assigned to the respective forage harvesting processing chain comprise two or more of: mowing machines; haymaking machines; swathing machines; harvesting machines; one or both of balers or loader wagons; transport vehicles; transport wagons; flatbed wagons; forklift truck; or compaction vehicles.

9. The assistance system of claim 1, wherein at least one processor is configured to access the at least one specified strategy by:

receiving an indication from a user; or determining by the assistance system; and wherein the at least one specified strategy comprises at least one respective intended use of harvested material.

10. The assistance system of claim 9, wherein the at least one respective intended use of the harvested material comprises one or more of:

biogas production from freshly harvested or ensiled crop material animal feed from the freshly harvested or ensiled crop material; or storage of the harvested material as hay.

11. The assistance system of claim 1, wherein the at least one specified strategy is selected from a plurality of quality parameters;

wherein each of the quality parameters have one or more quality criteria; and wherein the one or more of the quality criteria comprise one or more of:

fuel requirement;

throughput;

total cost;

harvested material quality;

harvested material loss;

energy content;

degree of soiling;

moisture of the harvested material; or crop yield.

12. The assistance system of claim 11, wherein the values for the work parameters comprise one or both of limit values for the plurality of quality parameters or values for the quality criteria; and wherein the memory is configured to save the limit values or transferred thereto.

13. The assistance system of claim 11, wherein an intended use of the at least one specified strategy is use of the harvested material as fresh harvested material or as silage for biogas production;

wherein the quality parameter comprises a quality criterion of moisture with a value range of 55-70% for moisture wherein at least one work parameter is cutting length of the harvested material with a value of the cutting length in a range of 4-10 mm;

wherein at least one work parameter is cutting time with a value of the cutting time being selected by the at least one processor such that a predetermined energy concentration is achieved in the harvested material, a predetermined compaction of the harvested material is achieved, and avoidance of incorrect fermentation is achieved; and wherein at least one work parameter comprises cutting height of a mower with a value of the cutting height being a range of 50-80 mm.

14. The assistance system of claim 11, wherein an intended use of the at least one specified strategy is the use of crop as freshly harvested material or as silage for animal feed;

wherein the quality parameter comprises a quality criterion of moisture with a value between 55 and 70%;

wherein at least one work parameter comprises addition of an amount of silage additive which promotes formation of lactic acid;

wherein at least one work parameter is chop length of the harvested material with a value of the chop length in a range of 4-25 mm; and wherein the at least one processor is configured to select a value for cutting length to be shorter the wetter the crop is; and wherein at least one work parameter comprises cutting height of a mower with a value of the cutting height in a range of 50-80 mm.

15. The assistance system of claim 14, wherein at least one value of the work parameter comprises an optimum wilting time;

wherein dry matter content of the harvested material is determined by analyzing the harvested material;

wherein an amount of silage additive is added depending on the dry matter content; and wherein the optimum wilting time is determined for an optimum dry matter content.

16. The assistance system of claim 11, wherein an intended use of the at least one specified strategy is use of the harvested material as hay; and wherein a quality criterion of moisture is a maximum of 15%.

17. The assistance system of claim 1, wherein the at least one processor is configured to generate the sequence of the process steps based on omission or repetition of at least one process step;

wherein at least one process step in the sequence of the process steps comprises mowing;

wherein responsive to determining that at least a quality of criterion of moisture is not within a predefined range, repeating turning of harvested material in the sequence of the process steps; and wherein responsive to determining that at least a quality of criterion of moisture is within the predefined range, omitting cracking of the harvested material in the sequence of the process steps.

18. The assistance system of claim 1, wherein the at least one processor is configured to optimize the values of the work parameters by optimization of a value of a raking height in the process steps of Turning and Swathing; and wherein the value of the raking height is higher responsive to a worse quality criterion of a degree of soiling.

19. The assistance system of claim 1, wherein the at least one processor is configured to optimize the values for the work parameters of cutting height and cutting time in the process step of mowing depending on one or more of quality criteria of degree of soiling and moisture; and wherein the at least one processor is configured to select the value for the cutting height to be higher and the cutting time to be later the worse the quality criteria of degree of the soiling and the moisture.

20. The assistance system of claim 1, wherein the at least one processor is further configured to suggest a change in quality parameters and associated quality criteria of the at least one strategy or a change from the at least one strategy responsive to determining that one or both of the quality parameters or the associated quality criteria of the at least one strategy is unable to be achieved due to one or both of machine failure or an imminent bad weather phase.

21. The assistance system of claim 1, wherein the at least one processor is configured to define type and scope of at least one process step of the sequence depending on one or more conditions of a preceding process step.

* * * * *